United States Patent [19]

Hennings

[11] 3,718,396
[45] Feb. 27, 1973

[54] SYSTEM FOR PHOTOGRAPHIC PRODUCTION OF SEMICONDUCTOR MICRO STRUCTURES

[75] Inventor: Klaus Hennings, Heilbronn, Germany

[73] Assignee: Licentia Patent-Verwallungs-G.m.b.H., Frankfurt am Main, Germany

[22] Filed: Dec. 28, 1971

[21] Appl. No.: 212,944

[52] U.S. Cl. ..................355/43, 355/53, 356/172
[51] Int. Cl. ..............................G01b 11/26
[58] Field of Search ......355/18, 46, 43, 53; 356/171, 356/172

[56] References Cited

UNITED STATES PATENTS

| 2,792,740 | 5/1957 | Haynes | 355/46 X |
| 3,623,807 | 11/1971 | Gabler | 355/18 |
| 3,628,869 | 12/1971 | Clay | 356/172 X |

OTHER PUBLICATIONS

Harper, "Aligning & Inspecting Microelectronic Circuits", 13 IBM Technical Disclosure Bulletin 1028, (Sept. 1970).

Primary Examiner—John M. Horan
Assistant Examiner—Michael Harris
Attorney—George H. Spencer et al.

[57] ABSTRACT

A system for producing microstructures on a substrate surface by forming an image of a mask, which contains a microstructure patter, on a photosensitive layer provided on such a substrate surface via a high resolution lens. The system has a semitransparent mirror and a microscope for observation of the alignment of a pattern to be formed on the substrate and another pattern already present on the substrate. The lens is built of a number of optical elements at least one of which is placed close to the substrate. The semitransparent mirror is placed between that element close to the substrate and the rest of the elements. A second mirror in the lens system provides for a compact symmetrical assembly. The system has illumination arrangements for projection of the mask pattern of the substrate using one wavelength, and for alignment using a different wavelength. The projection illumination arrangements are equipped with single or multiple source systems.

37 Claims, 16 Drawing Figures

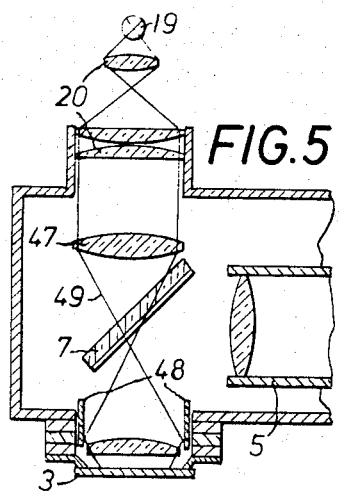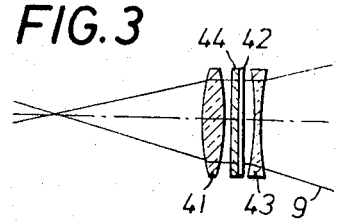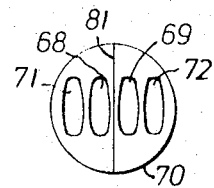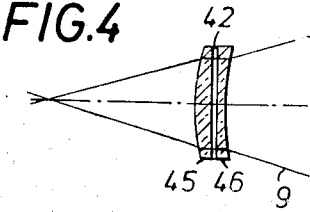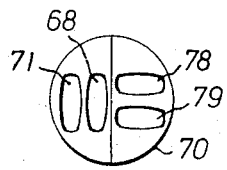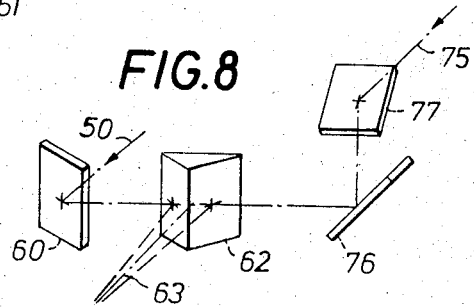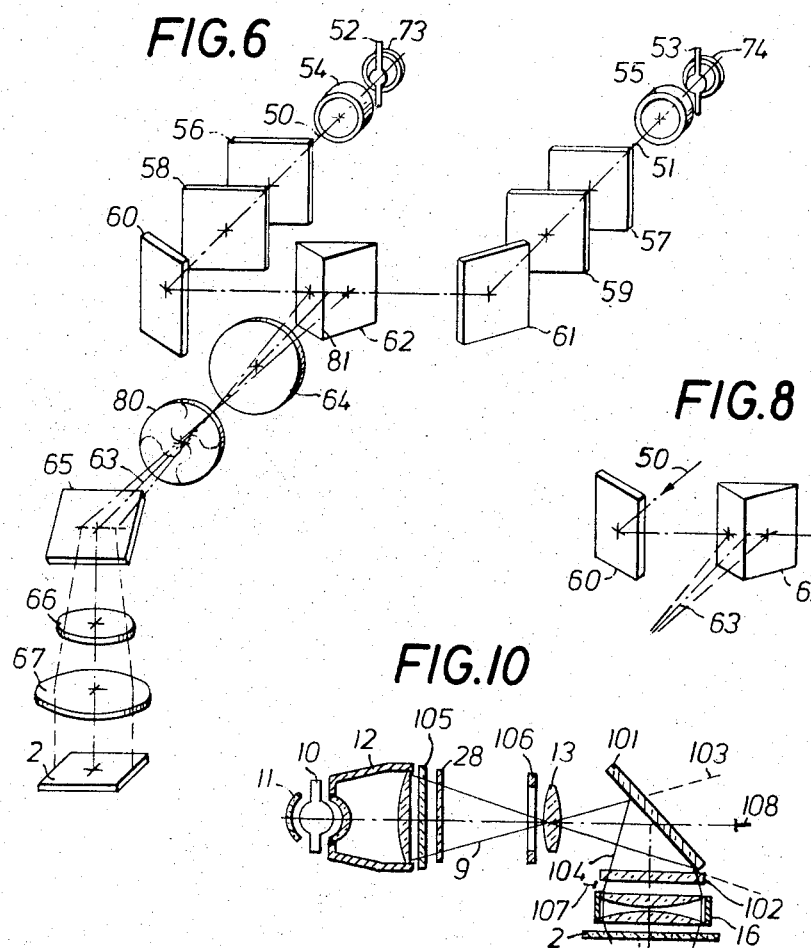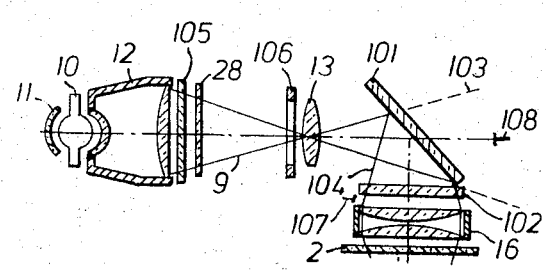

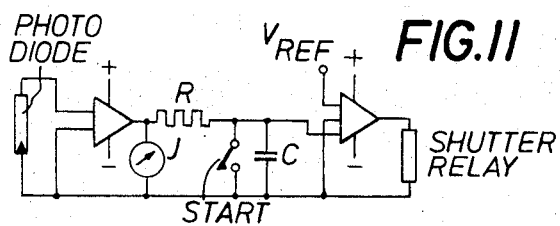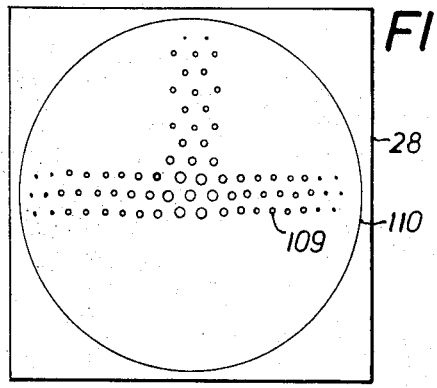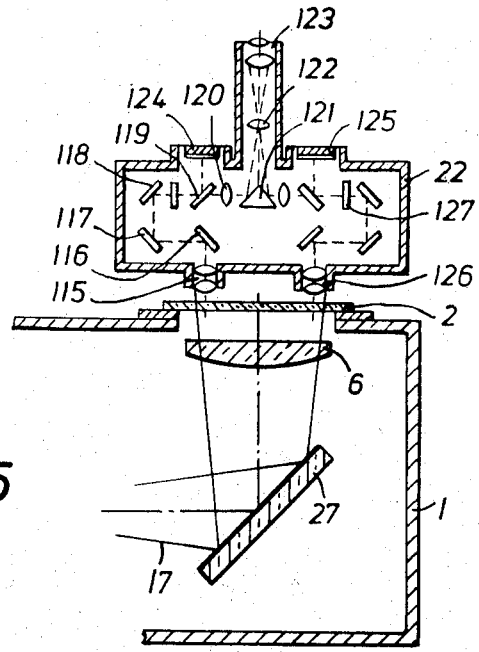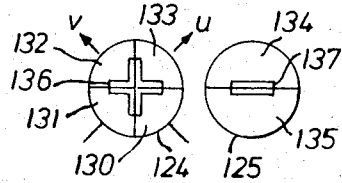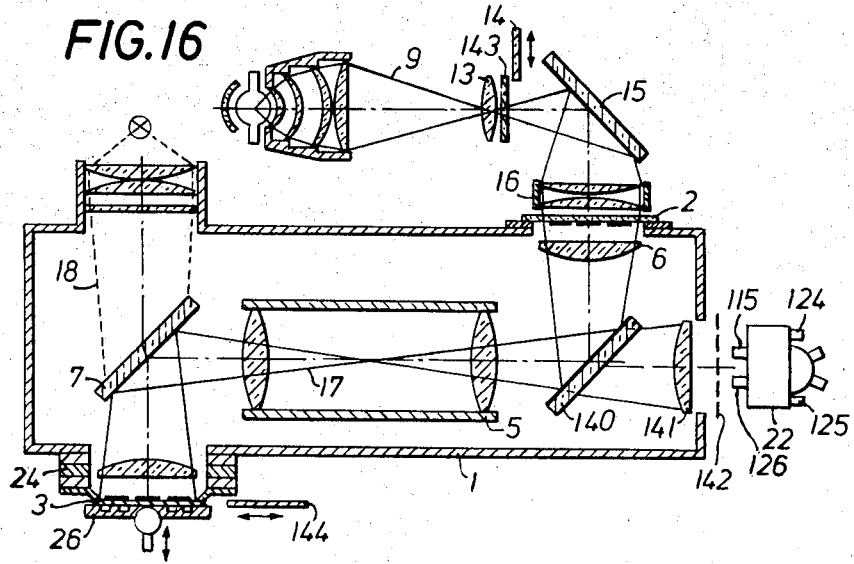

SYSTEM FOR PHOTOGRAPHIC PRODUCTION OF SEMICONDUCTOR MICRO STRUCTURES

BACKGROUND OF THE INVENTION

The present invention relates to an apparatus for producing microstructures on a substrate by means of optical imaging through a lens, and particularly to an apparatus for exposing a light-sensitive layer on this substrate with micro-structures contained in a mask and before exposure aligning the structures of the mask to another structure already present on that substrate.

In the production of semiconductor devices and integrated devices in general it is costumary to generate device patterns on the semiconductor wafer or substrate by photoresist techniques. Usually the substrates are coated with a thin layer of photoresist and exposed with the structure of a mask by contact printing this mask structure onto the photoresist layer. After developing the photoresist the resist structure is transferred to the substrate for example by etching or by deposition of a thin layer on top of the resist pattern and applying stripping technique. In the first case diffusion steps are following in the course of semiconductor production and the latter case mostly results in the formation of contacts and leads. This technique is described in more detail for example by Runyan in "Si-Semiconductor-Technology" McGraw Hill 1965.

Applying contact printing for exposing the photoresist layer with the mask pattern has a number of drawbacks which may be overcome by a projection printing technique. The most important advantages of projection printing are: No contact between mask and substrate and hence no defects in mask and wafer by mechanical stress during alignment and during clamping mask and wafer together, resulting in increased device yield and reduced mask cost, furthermore no spacing and clamping process for alignment and for exposure and with this no mechanical misalignment and no difficulties in observing the spaced patterns of mask and wafer with limited depth of focus of the observation microscope, and finally less difficulties in precise alignment and in mask making if the mask pattern is reproduced on the substrate in reduced size.

SUMMERY OF THE INVENTION

An apparatus for realization of a projection printing technique is described in my U.S. Pat. No. 3,542,469. It is the object of the present invention to overcome some minor drawbacks of this former apparatus and to improve the quality of the printed pattern and of the semiconductor devices produced by this projection printing technique. A more specific object of the present invention is to substantially increase the quality of the observed image during alignment of the patterns of mask and wafer and by this improve the alignment accuracy of the successive patterns during the semiconductor manufacturing process.

Another object of the invention is to increase the uniformity of pattern quality over a large image area and to reduce the exposure time necessary for exposure of the photoresist layer on top of the substrate.

A further object of the invention is the control of exact exposure of the photoresist layer on the substrate independent of light intensity fluctuations and last not least it is an object of the present invention to achieve an automatic alignment of the microstructures of mask and substrate.

These and other objects according to the invention are achieved in a system for producing a second microstructure, the configuration of which is contained in a mask and consists of a plurality of individual patterns, on a substrate provided with a first microstructure and a photosensitive layer on top by the reproduction of the second microstructure via a high resolution projection lens on the photosensitive layer in an aligned position to the first microstructure, performing the alignment of the two microstructures by illuminating the substrate with the first microstructures through a semitransparent mirror in the imaging ray path between substrate and mask, further producing an image of the first microstructure via the mirror and projection lens in the plane of the second microstructure in the mask and observing both patters with a microscope focused onto this plane, the improvement comprises: building the projection lens of a number of optical elements at least one of which is positioned close to the substrate and placing the semitransparent mirror in an 90° angle of the ray path between said elements close to the substrate and the rest of the elements.

BRIEF DESCRIPTION OF THE DRAWINGS

FIG. 3 and FIG. 4 are cross-sectional views of a detail of FIG. 2.

FIG. 5 is a cross-sectional view of a modified ray path according to the present invention.

FIG. 7 and FIG. 9 are views of images in a specific plane of the arrangements of FIG. 6 and FIG. 8.

FIG. 10 is a view similar to FIG. 2 showing a modification thereof.

FIG. 11 is a principal circuit diagram for an automatic control of exact exposure.

FIG. 12 is a plan view of a compensating plate for compensation of illumination nonuniformities.

FIG. 13 is a plan view of a sensor head of a light uniformity meter.

FIG. 14 is a cross-sectional view of an arrangement for automatic alignment.

FIG. 15 is a view of images reproduced on the sensor elements of the arrangement of FIG. 14.

DESCRIPTION OF THE PREFERRED EMBODIMENTS

Figure 1:
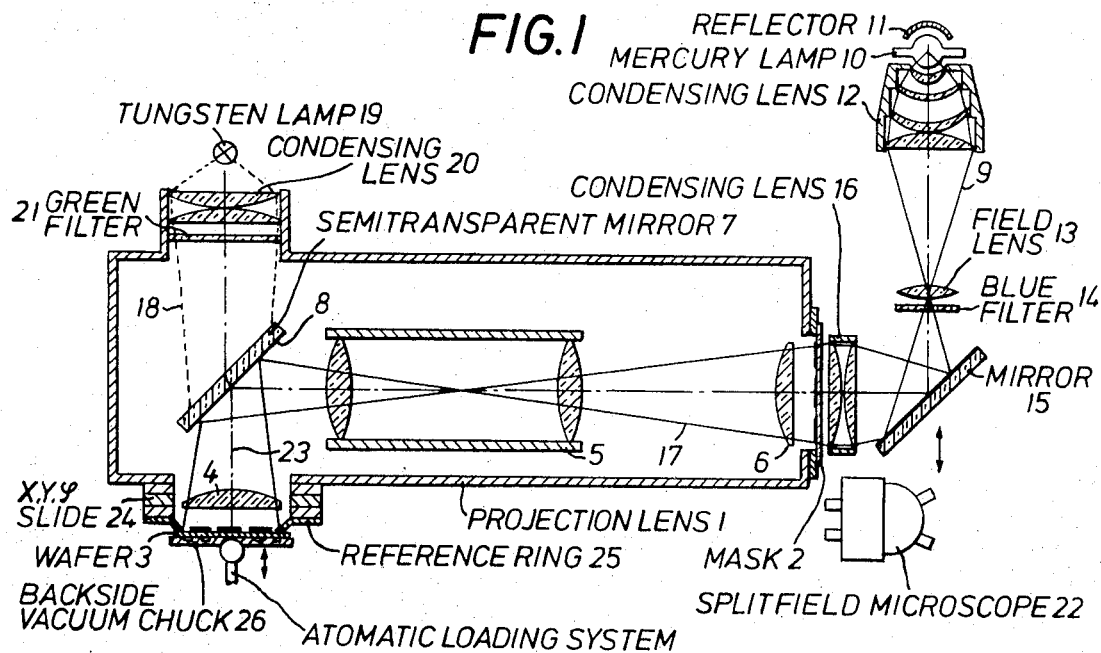
FIG. 1 is a cross-sectional view of an apparatus for projection masking showing the principle of the present invention.

The apparatus according to the invention will now be explained in detail with the aid of the arrangement shown in FIG. 1. A mask 2 containing the microstructure to be reproduced is placed in the object plane of a projection lens 1 and a substrate or wafer 3 is placed in the image plane of this lens. The projection lens 1 consists of a number of elements 4, 5, 6 and at least one element 4 of these lens elements is arranged close to the image plane containing the wafer 3 whereas the rest of the lens elements 5, 6 are separated from element 4 by a semitransparent mirror 7 bending the optical axis of the system by an angle of about 90°. It is understood that each part 4,5 and 6 of the lens again may consist of a group of separate elements. The semitransparent reflecting film 8 of this mirror 7 is applied to the lower mirror surface directed towards the lens elements 4 and 5 thus avoiding aberrations in the imaging raypath of the lens 1. During the reproduction of the mask pattern on the light sensitive layer on top of the substrate 3, from a light source 10 which is disposed in an illumination system including a reflector 11, first condensing lens 12, field lens 13, blue filter 14, mirror 15, and second condensing lens 16 a light beam 9 is directed to the mask 2 imaging the mask pattern onto the substrate 3 via the imaging raypath 17 through lens elements 6 and 5, mirror layer 8 and lens element 4.

In the alignment procedure of the first microstructure on the substrate or wafer 3 to the second microstructure in the mask 2 the first microstructure on top of the wafer 3 is illuminated by a second illuminating light beam 18 directed from light source 19 to the wafer 3 via condensing lens 20, green filter 21, through the total thickness of mirror 7 and via lens element 4. The illuminated microstructure of the wafer is reproduced in the plane of the mask pattern via the inverted imaging ray path 17 and both the first and the second microstructure are observed in the plane of the mask 2 by the splitfield microscope 22 which is interchangeable with the illumination system 10–16 and is moved in a position over the mask 2 for observation of pattern alignment. The alignment is performed, for example, by fine manipulation of the substrate or wafer 3 in a plane perpendicular to the optical axis 23 and rotation around this axis by means of an $x, y, \phi$-stage 24. The substrate or wafer 3 is held in its exact focal position by a reference ring 25 in connection with a clamping system shown as a backside vacuum chuck 26.

There are at least three important advantages of the system in comparison to the prior art descriped in U.S. Pat. No. 3,542,469. First the illuminating raypath 18 for illumination of the substrate surface during alignment procedure pierces only lens element 4 instead of the complete lens system as it does in U.S. Pat. No. 3,542,469. Hence stray light by diffuse reflection of illuminating rays at surfaces of the lens elements is much less during alignment observation resulting in higher contrast of the observed image and more accurate alignment. Secondly the aperture of illumination raypath 18 is not necessarily dependant on the aperture of the projection lens 1 which results in an additional degree of freedom in the construction of the illumination system 19–21. Finally the last lens elements 4 can be located very close to the image plane of the lens leading to a somewhat easier and more accurate correction of lens aberrations. This is a very important point of view in the construction of extremely high resolving lenses with total line numbers up to 25,000 line pairs necessary for this application.

In accordance to U.S. Pat. No. 3,542,469 it is understood that the lens is exactly corrected for two discrete wavelength one of which is used for pattern alignment as to avoid preexposure of the photoresist present on top of the substrate whereas the second wavelength is used for reproduction of the mask pattern in the photoresist which is sensitive to this second wavelength only. The wavelength for alignment observation may be, for example, a green wavelength as 546 nm and is selected by filter 21. The projection wavelength may be, for example, a blue wavelength as 405 or 436 nm and is selected by filter 14 between field lens 13 and second condensing lens 16.

In order to increase the efficiency of light transmission in both raypaths 17 and 18 going via the semitransparent mirror 7 it is possible to use a dichroic film for layer 8 of mirror 7 having high reflection at the projection wavelength and high transmission at the observation wavelength.

Figure 2:
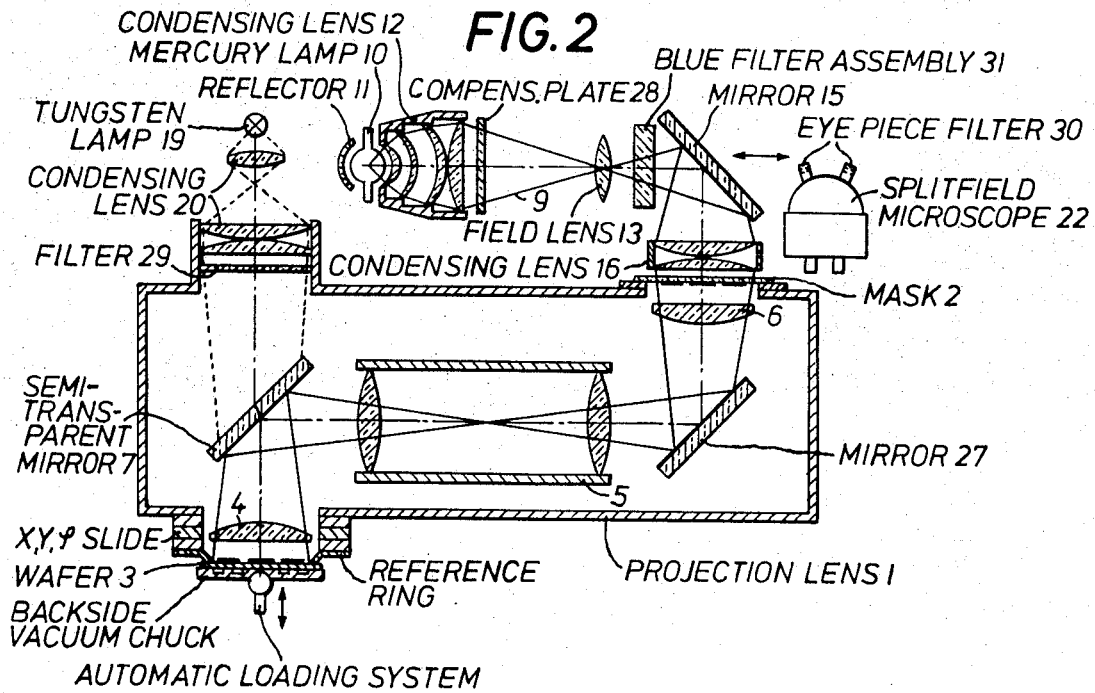
FIG. 2 is a view similar to FIG. 1 showing a modification of the above arrangement.

A somewhat different embodiment with some further features of the present invention is shown in FIG. 2. The projection lens 1 is built nearly completely symmetrical by adding a second mirror 27 between the lens elements 5 and 6 thus bending the optical axis of the system a second time by about 90°. This leads to a compact assembly of the entire system and allows a horizontal position both mask 2 and wafer 3. Mirror 27 may be a fully reflecting surface mirror. Furthermore a compensating plate 28 is introduced in the illumination ray path between first condensing lens 12 and field lens 13 for compensation of light non-uniformities over the illuminated area in the mask plane, which are due to non-uniform spatial radiation of the lamp. The compensating plate 28 consists of a transparent glass plate with a thin coating on one surface the local density of which changes over the area in order to compensate for the local intensity deviation. The compensating plate 28 acts as a special filter and compensates for the intensity decrease towards the periphery of the image field as well as for variations along the periphery due to symmetry deviations introduced by the bulb electrodes. Furthermore a shutter and a heat filter may be added in the raypath between first condensing system and field lens.

In FIG. 2 also the green filter 21 shown in FIG. 1 is split into two separate filters one of which is an edge filter 29 in place of the green filter 21 cutting down all wavelength below about 480 nm which could pre-expose the photoresist. The final filtering of the imaging light waves during alignment observation is achieved by a pair of eye piece filters 30 mounted in the eye pieces of the splitfield microscope 22. These are narrow band interference filters. The advantage of this principle is that interference filters with small diameter can be used with a small angle of incidence thus avoiding problems with oblique incidence at these multilayer filters. The center wavelength of these eye piece filters is matched to the chromatic aberration of each lens in order to compensate for small differences in the chromatic correction of the lenses coming out of the production line. This means, for example, if the projection wavelength of the system is set to exactly the wavelength 4047 A of the mercury spectrum, the corresponding observation wavelength resulting in disappearing focal and magnification differences may vary by ± 50 A from lens to lens and is matched by the eye piece filter.

For the same reason the filter assembly 31 is substituted for the blue filter 14 of FIG. 1. The details of this filter assembly are shown in FIG. 3. The diverging beam 9 is made parallel by a positive lens 41 before entering the thin multilayer interference filter 44 with layer 42 and after leaving this filter the beam is opend again to its prior aperture by a negative lens 43. By this intensity losses and small wavelength deviations at the periphery of the light beam 9 are eliminated.

A modification of this filter arrangement is shown in FIG. 4. Here the positive lens 45 and the negativ lens 46 are cemented together with the interference multilayer 42 in between. The advantage of this version is less reflection losses at the glass surfaces.

In another embodiment of the present invention shown in FIG. 10 which is a modification of FIG. 2, the reflecting mirror 101 is a cold light mirror reflecting only the short wavelengths 104 of light beam 9 and transmitting all long wavelengths 103. In this case the filter assembly 102 comparable to filter assembly 31 is placed in the vertical ray path 104 below mirror 101 in order to reduce the heat load of this filter. For increasing the efficiency of the cold light mirror 101 and for reducing the heat load of the field lens 13 and compensating plate 28 an additional heat filter 105 is disposed between first condensing system 12 and compensating plate 28.

In some applications it may be advantageous to have a dark field illumination of the wafer. This may be accomplished by the illumination raypath shown in FIG. 5. The dark field illumination beam 49 is directed towards a cylindrical mirror 48 by means of the lens 47 and reflected to the substrate 3 with oblique incidence.

In projection printing technique light intensity and resulting exposure time is a point of special interest because of limited usable bandwith of the illumination system due to chromatic aberrations of the lens. In a specific application of the system of the present invention, for example, a mercury vapor lamp of 500 watts may be used in conjunction with a filter 14 having a bandwith of about 3 nm at 405 nm wavelength resulting in an exposure time around 15 seconds for a certain photoresist as, for example, Shipley AZ 111. In order to reduce this exposure time an advantageous further modification of the present invention involves the employment of the multiple source illumination system, an embodiment of which is shown in FIG. 6. The illuminating beams 50 and 51 of two light sources 52 and 53 with condensing systems 54, 55, heat filters 56, 57 and compensating plates 58, 59 are combined by two reflecting mirrors 60 and 61 and a reflecting prism 62 into a joint beam 63. In all other respects the primary raypath of each branch and also the joint raypath is comparable to the raypath 9 shown in FIG. 2, going via a field lens 64, mirror 65, filter 66 and second condensing lens 67 to the mask 2. A shutter 80 may also be added to the joint raypath. The combination of the two branches 50, 51 is achieved by reproducing an image 68 of the light source 52 in the plane of the field lens 64 in the corresponding half of the opening 70 of this field lens 64 which is optically divided by the prism edge 81, as shown in FIG. 7. In the same way an image 69 of light source 52 is produced in the other half of the field lens. 71 and 72 are secondary images of light sources 52 and 53 reproduced by reflecting concave mirrors 73 and 74 behind the light bulbs. As with the illumination raypath in FIG. 1 and FIG. 2 the openings of condensing lenses 54 and 55 are reproduced in the opening of the second condensing lens 67 and at the same time the opening of the field lens 70 including the light source images 68, 69, 71, 72 is reproduced in the entrance pupil of the projection lens 1.

FIG. 8 shows a modification of the system of FIG. 6 inasmuch as the illuminating light beam 75 is bent twice by mirror 76 and mirror 77 thus rotating the images of light source 53 by 90 degrees to position 78 and 79 in the field lens opening 70 of FIG. 9. This results in a compensation of light intensity variations along the periphery of the illuminated field in the plane of mask 2 and wafer 3 which are produced by unsymmetrical radiation distribution of the lamps due to their electrodes.

In a further modification of the arrangement of FIG. 6 not shown in the figures the reflecting prism 62 and mirrors 60, 61 may be replaced by a refracting prism for splitting the beam path 63 into the two branches 50 and 51.

In another embodiment of the present invention the beam path 63 may be split in 3,4 or even more branches with separate light sources by employing a multiple flat pyramidal prism.

In projection printing technique exposure time is more critical than with contact printing. Therefore it is advantageous to eliminate variations of light intensity which are produced by line voltage or temperature fluctuations or by aging of the lamp. This is achieved in a further embodiment of the present invention demonstrated in FIG. 10 and FIG. 11. A sensor 107 which may be, for example, a photo cell is mounted close to the raypath 104 and collects stray light reflected by the surface of condensing lens 16 and filter assembly 102. The sensor is connected to an amplifier and meter I, indicating the light intensity as shown in FIG. 11. An integrating RC-circuit, a reference voltage $V_{REF}$ and another amplifier are applied for measurement of the total exposure I x time, operating the shutter 106 after a preditermined exposure is obtained.

In a modification of this embodiment the sensor is placed in position 108 instead of 107. This results in a more accurate measurement of light intensity in the center of the illuminated area, whereas sensor 107 measures average value of the light intensity over the entire field. However, one advantage of sensor 107 is its sensitivity to reflection of light at the mask 2. This results in somewhat less exposure for chromium masks in comparison to emulsion mask which is a desirable effect.

Another embodiment of the present invention is shown in FIG. 12 involving the details of the compensating plate 28 or 58, 59 respectively. On a transparent glass plate a metal pattern 109 is disposed inside the area 110 illuminated by the light cone 9. The metal pattern consists of a grid of circular dots varying in dot diameter. For compensating of decreasing light intensity towards edge of the light cone and in the upper and lower region of the illuminated area 110 correlated to the position of the lamp electrodes the dot diameter decreases too. This means that decrease of dot size from center to edge is more rapidly along a vertical diameter than along a horizontal diameter, as can be seen from FIG. 12.

The compensating plate or an original of it may be manufactured by using a grid of holes with constant dot size as a pattern for exposing a positive working photoresist layer on top of a glass plate. In this case it is possible to expose the photoresist with the light beam which has to be compensated. Areas of the light beam having high intensity produce some overexposure of the resist resulting in large dots whereas areas of less intensity produce less exposure resulting in smaller dots. After development of the resist a metal layer is applied on top and the resist layer with the metal layer on top of the resist stripped off leaving the desired metal dots on the plate. In principle also a negative resist in connection with etching the metal layer could be applied, but transitions between different exposure levels are more homogenious with positive resist. In an example advantageous for the present invention the dot size varies between 0 and 5 microns with a grid constant of 15 microns.

It is one advantage of the procedure described above, that the original obtained may be duplicated by standard copying methods without changing its characteristic. During duplicating the deposited metal thickness and its resulting transparency is an additional degree of freedom for matching the compensating plate to a special light beam. High thermal stability and long lifetime are further advantages. In order to reduce reflection losses furthermore it is possible to combine compensating plate 28 and heat filter 105 by depositing the metal pattern on a heat filter plate. FIG. 13 shows another advantageous arrangement according to the present invention. In order to measure the distribution of the light intensity in the illuminated area of the mask or the substrate it is possible to scan the area with a single photo cell. This time-consuming procedure is improved by the arrangement of FIG. 13. On a sensor head 111 6 separate photo cells 112 are positioned along the periphery of the illuminated area and one further cell 113 in the center. Each of these 7 photo cells is connected to a separate amplifier and indicator and all seven channels are adjusted to same sensitivity. By this it becomes possible to observe the uniformity of illumination with a single view. The sensors may be silicon photo diodes matched to the spectral intensity distribution of the illumination system by a blue filter on top of the cell.

In the system described so far which is usually called a projection mask aligner, alignment of the first microstructure on the substrate to the second microstructure in the mask is achieved by visual observation through a splitfield microscope 22 and manual manipulation of substrate or mask. In order to obtain an automatic alignment of the patterns of mask and substrate a method may be applied which is described in my patent application Ser. No. 30,051, filed Apr. 20, 1970, titled "Method for The Automatic Alignment of Tow Articles to be brought into Register with One Another". The application of this method in a further embodiment of the present invention is shown in FIG. 14. In the splitfield microscope 22 already described in connection with FIG. 1 and FIG. 2 an image of the patters of mask and substrate is reproduced by an objective lens 115 in the plane of the field lens 120 via 3 reflecting mirrors 116, 117, 118 and through a beam splitter 119. This image again is reproduced by lens 122 in the eye piece 123 via a prism 121 and can be visually observed by means of this eye piece 123. Another area of mask and substrate is observed by the second objective lens 126 and its corresponding raypath. Both images are combined by the prism 121 resulting in a split image in the eye piece having one half of the image field of both objective lenses 115, 126 if appropriate half field diaphragms are involved in the raypath close to lens 122.

In the embodiment related to the present invention a further image of the patterns is reproduced by the objective lens 115 in the plane of a sensor cell 124 via the beam splitter 119 and by objective lens 126 in the plane of sensor cell 125. The surface of sensor cell 124 is divided into 4 equal separate elements 130, 131, 132, 133 as shown in FIG. 15. The sensor elements 130 and 132 are connected to a differential amplifier controlling the movement of mask or substrate via a servomotor in $v$-direction whereas sensor elements 131 and 133 are controlling movement in $u$-direction via another differential amplifier and servomotor. In the same way sensor 125 is divided in two parts 134 and 135 connected to another differential amplifier controlling rotation of mask or substrate. If the alignment marks 136 for u and v and 137 for $\phi$ are in a symmetrical position to the corresponding sector elements as shown in FIG. 15 alignment is completed and the servomotors for $u$, $v$ and $\phi$ are stopped.

In a modification of the embodiment described above an electronically scanned multi-diode array may be used for detecting the position in respect to this array instead of the lateral extended sensor having 4 or 2 sectors.

In order to match the imaging raypath of the splitfield microscope to the illuminating raypath 18 and 17 of the projection lens 1 it is advantageous to use an aperture of the objective lenses 115, 126 about twice as high as the aperture of the projection lens 1. Furthermore in the arrangement for automatic alignment described above the eye piece filters 30 for the observation wavelength of the system are substituted by filters 127 before the beam splitters 119 having the same filter characteristic as filters 30. Furthermore it is understood that usually a pair of eye pieces is applied instead of only one 123 shown in FIG. 14 for simplification. Also an additional tube lens may be added between mirrors 116 and 117 allowing a parallel raypath between the objective lenses and these tube lenses. In a further embodiment of the present invention involving automatic alignment between patterns of mask and substrate as described above the second mirror 27 (FIG. 2) of the projection lens 1 is also provided with a dichroic semitransparent film in the same manner as with the semitransparent mirror 7. Again the semitransparent film is deposited on that surface of the glass plate directed towards the lens elements and again the semitransparent film has a maximum reflectivity at the wavelength used for projection of the mask pattern to the photo sensitive layer on the substrate and a high transmission at the wavelength used for observation of pattern alignment or for automatic alignment respectively. As shown in FIG. 16 this second semitransparent mirror 140 is applied for the reproduction of a second image of the microstructure of substrate 3 in the plane 142 conjugated to the plane of the mask 2. An additional lens element 141 balancing lens element 6 is placed in the raypath behind mirror 140. Also aberrations introduced by the glass thickness of mirror 140 may be compensated at least partially by lens element 141.

A splitfield microscope 22 equipped with means for automatic alignment as described in connection with FIG. 14 is focused to the image plane 142. Via this microscope or its sensor elements 124, 125 respectively the microstructure on the substrate is observed by illuminating it with the light beam 18. Both structures the one on the substrate and the structure of the mask may be observed simultaneously in the microscope 22 if the mask pattern is reproduced on the substrate 3 by the light beam 9 via imaging raypath 17 and the substrate pattern together with the mask pattern reproduced on the substrate are imaged back to the plane 142 via the reversed imaging raypath 17. In this case the blue filter 31 of FIG. 2 for the projection wavelength is replaced by a filter 143 for the observation wavelength. On the other hand it is also possible to observe the mask pattern only in the microscope 22 if the substrate 3 is replaced by an auxiliary blank surface or reflecting mirror 144 in the image plane of the projection lens 1 and light beam 9 with filter 143 is used for illumination. This auxiliary mirror may also be, for example, the surface of the bare substrate holder.

Making use of these possibilities inherent in the arrangement of FIG. 16 an automatic pattern alignment may be performed, for example, by first reproducing the mask pattern only in the splitfield microscope by means of said mirror 144 in the place of the substrate and aligning the mask pattern to the microscope or its sensor system 124, 125 respectively either by moving the mask 2 or by moving the microscope 22 via servomotors. Subsequently the auxiliary mirror is replaced by the substrate 3 which is now aligned to the sensor system of the splitfield microscope wherein the substrate is illuminated by light beam 18 and is moved by servomotors in respect to the entire system having fixed positions of mask and microscope. Because usually the mask will not be replaced for a larger number of wafers all of which have to be exposed with the same pattern, the first step of this procedure aligning microscope and mask has to be performed only once for all of these wafers. It is a specific advantage of this procedure that both alignment steps, mask to microscope and substrate to microscope, are indipendant of each other. In both steps the sensor system is the reference system.

In a somewhat modified procedure again the mask is aligned to the microscope first by reproducing the mask pattern on the sensor system with light beam 9 and filter 143 via the auxiliary mirror 143. But in contrary to the procedure described before subsequently both patters of mask and substrate are reproduced simultaneously on the sensor system by light beam 9 with filter 143 and the resulting signal of the sensing system controls alignment of the substrate pattern to the mask pattern by moving the substrate via servomotors. In this case the superimposed mask pattern serves as a reference pattern for the alignment of the substrate pattern and as a result small mechanical deviations between alignment of mask to microscope and of substrate to mask are negligible.

Furthermore also a third principle may be applied for this procedure of automatic pattern alignment. In this case the substrate is aligned to the microscope first by illuminating it with light beam 18. After this the mask is aligned to the microscope using light beam 9. The influence of the substrate pattern to this alignment step is small because of high contrast of the mask pattern in comparison to the substrate pattern. In order to completely eliminate this small influence the alignment mark of the mask may be moved out of the image field of the sensor system by a certain distance after the mask was roughly aligned to the microscope and then the mask is aligned to the microscope and after this the substrate pattern is aligned to the mask pattern as described above using the mask pattern as a reference pattern. In principle this means that in comparison to the first two principles a bare area of the substrate is used for alignment of the mask pattern to the microscope instead of mirror 144.

It is understood that in all steps aligning the mask the sensor system is connected to the servomotors of the mask and in aligning the substrate to the servomotors of the substrate respectively.

Furthermore it is understood, that the second semitransparent mirror 140 may be replaced by a beam splitter with similar dichroic characteristic but better correction of lens aberrations than it is possible with the mirror 140 due to oblique incidence of the imaging raypath 17.

I claim:

1. In a system for reproducing a second microstructure, the configuration of which is contained in a mask, and which includes at least a plurality of individual patterns, on a substrate which is provided on a surface thereof with a first microstructure and an overlying photosensitive layer, the system including means for reproducing the second microstructure via a high resolution projection lens means on the photosensitive layer in an aligned position to the first microstructure, means for aligning the two microstructures including means for illuminating the substrate with the first microstructure thereon through a semitransparent mirror means positioned in the imaging raypath between the substrate and the mask, means for producing an image of the first microstructure via the semitransparent mirror means and the projection lens means in the plane of the second microstructure in the mask, and microscope means focused onto this plane for observing both the image of the first microstructure and the second microstructure, the improvement wherein said high resolution projection lens means comprises a plurality of optical elements, with at least one of said plurality of optical elements being positioned close to the substrate, and wherein said semitransparent mirror means is positioned at an angle to the raypath and between said at least one optical element and the rest of said plurality of optical elements.

2. An arrangement as defined in claim 1 wherein said semitransparent mirror means is a transparent glass plate with a thin semitransparent reflecting film disposed on that surface of said glass plate directed towards said plurality of optical elements.

3. An arrangement as defined in claim 2 further comprising second mirror means added to said projection lens means in a position symmetrical to said semitransparent mirror means whereby the imaging raypath is bent twice by an angle of substantially 90°.

4. An arrangement as defined in claim 2 wherein said means for reproducing includes a first light source of a first wavelength, wherein said means for illuminating comprises a second light source of a second wavelength used for the illumination of the substrate during alignment observation, and wherein said semitransparent reflecting thin film has a reflection-transmission ratio depending on wavelength with maximum reflection at said first wavelength used for the reproduction of the second microstructure on the photosensitive layer and with less reflection and increased transmission at the second wavelength used for the illumination of the substrate during alignment observation.

5. An arrangement as defined in claim 4 wherein said projection lens means is a lens means corrected for disappearing chromatic aberration for the two wavelengths and wherein said first wavelength for projection is shorter than said second wavelength for alignment observation.

6. An arrangement as defined in claim 1 wherein said means for reproducing comprise a light source, a reflector behind said light source, a first condensing lens means, a heat filter, a compensating plate for compensating illumination non-uniformity, a shutter, field lens means, narrow band filter means, a second mirror means and a second condensing lens means, and wherein, during reproduction of the second microstructure on the substrate, said mask is illuminated by a light beam directed from said light source and said reflector through said first condensing lens means, said heat filter, said compensating plate, said shutter, said field lens means and said narrow band filter means and via said second mirror means through said second condensing lens means, said mask and said projection lens means to the substrate.

7. An arrangement as defined in claim 6 wherein said projection lens means includes an entrance pupil and wherein said first condensing lens means is effective to reproduce said light source in said field lens means, and wherein said second condensing lens means is effective to reproduce said field lens means including the image of said light source in said entrance pupil of said projection lens means.

8. An arrangement as defined in claim 6 wherein said first condensing lens means includes an opening, and wherein said field lens means is effective to reproduce said opening of said first condensing lens means in said mask.

9. An arrangement as defined in claim 6 wherein said narrow band filter means comprises a narrow band filter, a positive lens positioned before said narrow band filter and a negative lens positioned behind this filter whereby the raypath piercing said narrow band filter between said positive lens and said negative lens is substantially parallel.

10. An arrangement as defined in claim 6 wherein said second mirror means is a cold light mirror effectively reflecting only the short wavelengths of the light beam to said mask and transmitting all long wavelengths.

11. An arrangement as defined in claim 4 wherein said means for aligning further comprise a condensing system and a filter means, and wherein, during alignment of the microstructures, the substrate is illuminated by a light beam directed from said second light source through said condensing system and said filter means through said semi-transparent mirror means and said at least one optical element close to the substrate to said substrate and reflected back by the substrate through said projection lens means to said mask and into said microscope means.

12. An arrangement as defined in claim 11 further comprising a cylinder having a reflecting inner surface and positioned between said semi-transparent mirror means and the substrate, and wherein dark field illumination of the substrate is achieved by reflecting the light beam at said reflecting inner surface of said cylinder resulting in oblique incidence of light at the substrate.

13. An arrangement as defined in claim 11 wherein said filter means comprises a long wavelength transmitting edge filter transmitting wavelengths only which do not expose the light sensitive layer on top of the substrate and a narrow band filter for said second wavelength for alignment observation disposed in the eye piece of said microscope means.

14. An arrangement as defined in claim 1, wherein said means for reproducing include: a prism, field lens means, reflecting mirror means, narrow band filter means and condensing lens means positioned in the denominated order in the beam path between said mask and said prism; at least two separate light sources and a separate reflector behind each light source; a separate condensing system, a separate heat filter, a separate compensating plate and a separate mirror means arranged in the denominated order in the respective beam path between each respective one of said light sources and said prism; and wherein the light beam consists of two or more parts each of which is directed from a separate one of said light sources and the respective reflector behind each light source through the respective condensing system, the respective heat filter, the respective compensating plate, the respective separate mirror means and one side of said prism to said field lens means where all parts of the light beam are combined to one light beam continuing through the beam path defined by said reflecting mirror means, said narrow band filter means, said condensing lens means, said mask and said projection lens means to the substrate.

15. An arrangement as defined in claim 14 wherein each said condensing lens system includes an opening, and wherein said field lens means is effective to form one common image of said openings in said mask.

16. An arrangement as defined in claim 14 wherein said prism is a refracting prism with a number of sides corresponding to the number of said separate light sources.

17. An arrangement as defined in claim 14 wherein each of said condensing systems is effective to reproduce an image of a respective one of said light sources in a corresponding part of said field lens means, said part of said field lens means being defined by the corresponding side of said prism.

18. An arrangement as defined in claim 17 wherein each of said condensing systems is effective to produce a secondary image of a respective one of said light sources from said reflectors behind said light sources in said field lens means side by side with the direct image.

19. An arrangement as defined in claim 17 further comprising an additional separate mirror means positioned in the path of at least one of the parts of the light beam, at least one of the parts of the light beam being directed via said additional separate mirror means thereby rotating the corresponding image of at least one of said separate light sources reproduced in said field lens means by an angle of 90°.

20. An arrangement as defined in claim 6 further comprising a photo cell mounted close to the illumination light beam between said narrow band filter means and said second condensing lens means for collecting stray light from the light beam to produce a signal indicative of light intensity, an amplifier responsive to the signal indicative of light intensity and a meter responsive to the output from said amplifier for indicating light intensity, and control means including an integrating circuit and responsive to the output of said amplifier for controlling the effective exposure of the photosensitive layer on the substrate given by the product of light intensity times time via said integrating circuit operatively arranged to control said shutter.

21. An arrangement as defined in claim 10 further comprising a photo cell disposed in the rear of said cold light mirror in position to sense the center of that part of the illuminating light beam transmitted through said cold light mirror, said photo cell providing an output indicative of light intensity, and control means responsive to the output from said photo cell for controlling effective exposure of the photosensitive layer on the substrate.

22. An arrangement as defined in claim 6 wherein said compensating plate for compensation of illumination non-uniformity is a transparent glass plate with a metal pattern disposed thereon this pattern consisting of a grid of dots the size of which varies with position in the illuminating light beam in order to compensate locally for decreasing light intensity by decreasing dot size.

23. An arrangement as defined in claim 22 wherein said grid of dots is composed of dots of varying dot size along each diameter of the light beam for decreasing intensity from center to edge and also along the periphery for decreasing intensity due to influence of lamp electrode means of said light source.

24. An arrangement as defined in claim 22 wherein said compensating plate is a compensating plate made by copying from an original and the original is produced by exposing a positive acting photoresist with the non-uniform light beam to be compensated or an equivalent intensity distribution through a mask containing a grid of holes having constant diameter, and further generating said metal pattern from this photoresist by depositing a metal layer on top of the photoresist and applying stripping technique.

25. An arrangement as defined in claim 6 further comprising a seven channel illumination uniformity meter means, and wherein the intensity of the illuminating light beam in the plane of said mask or said substrate is measured by said illumination uniformity meter means, said meter means having six photo cells disposed along the peripherey of the illuminated area and one photo cell in the center of the illuminated area each of which is connected to a separate amplifier, and means responsive to outputs of said separate amplifiers for indicating the local light intensity, all seven channels being calibrated to the same sensitivity.

26. An arrangement as defined in claim 25 further comprising a filter disposed on top of said photo cells for matching the spectral sensitivity of the photo cells to the spectral behavior of said light source and the photosensitive layer on top of the substrate, particularly suppressing all wavelengths of light not exposing the photosensitive layer on the substrate.

27. An arrangement as defined in claim 11 wherein said aligning means includes means for automatically aligning the microstructure of said mask and the microstructure of the substrate, said means for automatically aligning including a photoelectric servomechanism having servomotor means and two sensor cells, the sensor cells being positioned in said microscope means, said micorscope means being a splitfield microscope with one of said sensor cells in each branch, the sensor cells being controllably coupled to said servomotor means for relatively moving and rotating said mask and the substrate with respect to each other in a plane perpendicular to the optical axis.

28. An arrangement as defined in claim 27 wherein said splitfield microscope is provided with an objective lens, several mirrors, a narrow band filter and a beam splitter in each branch, the illuminating light beam being directed from said second light source via the substrate and said projection lens means into said splitfield microscope for reproducing an image of the microstructures on said sensor cells in said splitfield microscope by imaging through said objective lens of said splitfield microscope via said several mirrors of the microscope, said narrow band filter of the microscope in each branch and said beam splitter of the microscope in each branch; said splitfield microscope having a field lens in each branch, a further lens and a prism; and wherein another image is reproduced in each of said field lenses behind each of said beam splitters which again are reproduced in an eye piece of said splitfield microscope by said further lens via said prism.

29. An arrangement as defined in claim 27 wherein one of said sensor cells is divided into four equal sector elements with two diagonally opposite elements thereof defining a pair, each said pair developing signals to control relative movement between said mask and the substrate in one of two orthogonal directions corresponding to the orientation of said one sensor cell, the second cell of said sensor cells being divided into two sectors for developing signals to control the relative rotation between said mask and the substrate.

30. An arrangement as defined in claim 27 wherein each sensor cell is an electronically scanned multidiode array operatively arranged to detect the position of the microstructures of said mask and the substrate for developing control signals to control the relative movement of said mask and the substrate.

31. An arrangement as defined in claim 3 further comprising an additional optical element and wherein said second mirror means is semitransparent in the same way as said first semitransparent mirror means, both semitransparent mirror means being equivalent and wherein a second image of the plane containing the substrate surface is formed in a plane conjugated to the plane of said mask by imaging through said second semi-transparent mirror means and said additional optical element positioned close to the conjugated plane, and wherein said microscope means is a splitfield microscope focused to said second image.

32. An arrangement as defined in claim 31 wherein said second semitransparent mirror means, said first semitransparent mirror means and their associated optical elements are operatively arranged so that an image of the substrate surface in the plane of said second image is produced by illumination of the substrate surface, through said first semitransparent mirror means, superimposed images of said mask and the substrate surface in the plane of the second image are produced by illumination of said mask, and an image of the mask pattern only is produced in the plane of the second image by illumination of said mask and reflection of the mask image on a bare area of the substrate.

33. An arrangement as defined in claim 31 including means defining a blank surface in place of the substrate surface and means for reproducing an image of the mask pattern only in the plane of the second image by illumination of said mask and reflection of the mask image on said blank surface.

34. An arrangement as defined in claim 31 further comprising a plurality of servomotors and controlling amplifiers, and wherein said splitfield microscope is equipped with means for automatic alignment of the mask pattern and the substrate pattern comprising two sensor elements correlated respectively to two Cartesian coordinates and rotation, each sensor element being mounted in one branch of said splitfield microscope and being coupled to said servomotors via said controlling amplifiers for moving said mask during alignment of the substrate.

35. An arrangement as defined in claim 33 further comprising a sensor system including two sensor elements and wherein said means for aligning includes: mass responsive to outputs from said sensor elements for automatically aligning patterns of said mask and the substrate; means for first reproducing the mask pattern only on said sensor elements by illuminating of said mask reflecting the mask image via said blank surface and aligning said mask to the sensor system; and means for subsequently reproducing the substrate pattern only on said sensor elements by illuminating the substrate through said first semitransparent mirror means and aligning the substrate with respect to said sensor system.

36. An arrangement as defined in claim 33 further comprising a sensor system including two sensor elements and wherein said means for aligning comprise alignment means responsive to outputs from said sensor elements for automatically aligning patterns of said mask and the substrate; said alignment means including: means for first reproducing the mask pattern only on said sensor elements by illuminating the mask, reflecting the mask image via said blank surface and aligning said mask to the sensor system; and means for subsequently reproducing the substrate pattern superimposed with the mask pattern on the sensor elements by illuminating said mask and aligning the substrate pattern with respect to the mask pattern which after its alignment serves as a reference over the sensor system.

37. An arrangement as defined in claim 33 further comprising a sensor system including said two sensor elements and wherein said means for aligning comprise alignment means responsive to outputs from said sensor elements for automatically aligning patterns of said mask and the substrate; said alignment means including: means for first reproducing the substrate pattern only on said sensor elements by illuminating the substrate through said first semitransparent mirror means, aligning the substrate to the sensor system and subsequently moving alignment marks of the substrate out of sensing position for an adjoining bare area of the substrate, said bare area defining said blank surface; means for subsequently reproducing the mask pattern only on said sensor elements by illuminating said mask and reflecting the mask image via the bare area of the substrate and aligning the mask pattern to the sensor system; means for further moving the alignment marks of the substrate back; and means for reproducing the substrate pattern superimposed with the mask pattern on said sensor elements by illuminating said mask and aligning the substrate pattern to the mask pattern which after its alignment serves as a reference over the sensor system.

* * * * *